United States Patent [19]

Takano et al.

[11] Patent Number: 4,603,254

[45] Date of Patent: Jul. 29, 1986

[54] METHOD OF STORING RADIATION IMAGE DATA

[75] Inventors: Masao Takano; Hisatoyo Kato, both of Kanagawa, Japan

[73] Assignee: Fuji Photo Film Co., Ltd., Kanagawa, Japan

[21] Appl. No.: 545,291

[22] Filed: Oct. 25, 1983

[30] Foreign Application Priority Data

Nov. 4, 1982 [JP] Japan .............................. 57-193768

[51] Int. Cl.[4] .............................................. G01T 1/105
[52] U.S. Cl. .................................. 250/327.2; 364/414
[58] Field of Search ...................... 250/459.1, 327.2; 369/14, 15; 360/11.1; 364/414

[56] References Cited

U.S. PATENT DOCUMENTS

| | | | |
|---|---|---|---|
| 4,133,009 | 1/1979 | Kittler et al. | 358/313 |
| 4,258,264 | 3/1981 | Kotera et al. | 250/484.1 |
| 4,276,473 | 6/1981 | Kato et al. | 250/327.2 |
| 4,346,295 | 8/1982 | Tanaka et al. | 250/327.2 |
| 4,458,267 | 7/1984 | Dolazza | 358/111 |
| 4,490,747 | 12/1984 | Yokoyama | 358/296 |

Primary Examiner—Craig E. Church
Assistant Examiner—Constantine Hannaher
Attorney, Agent, or Firm—Sughrue, Mion, Zinn, Macpeak and Seas

[57] ABSTRACT

A stimulable phosphor sheet carrying a radiation image stored therein is scanned with stimulating rays, and the light emitted from the stimulable phosphor sheet in proportion to the radiation energy stored therein is detected and converted into an electric signal. The electric signal is converted to a digital signal. On the basis of the digital signal, there are created digital data in an amount necessary for reproducing the radiation image for use in diagnosis, and digital data for storage obtained by reducing the amount of information to a fraction of the amount of the digital data for diagnosis. The two kinds of digital data are recorded in separate recording media.

4 Claims, 1 Drawing Figure

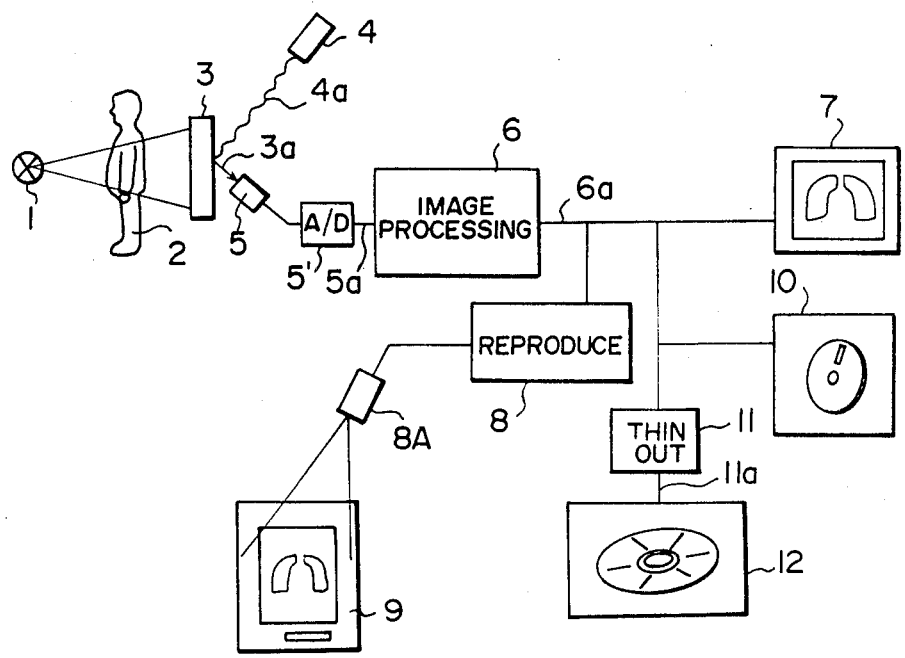

METHOD OF STORING RADIATION IMAGE DATA

BACKGROUND OF THE INVENTION

1. Field of the Invention

This invention relates to a method of storing radiation image data. This invention particularly relates to a long-term storage method for image data obtained in a radiation image recording and reproducing system for diagnosis using a stimulable phosphor sheet.

2. Description of the Prior Art

A novel system for recording and reproducing a radiation image by use of a stimulable phosphor is disclosed, for example, in U.S. Pat. Nos. 4,258,264 and 4,276,473, U.S. Pat. No. 4,346,295 (DE-OS No. 29 51 501), and Japanese Unexamined Patent Publication No. 55(1980)-103472. As described in "Shashin Kogyo" (Photographic Industry), Vol. 40, No. 11 (Ser. No. 401), page 122, this system conducts various image processings on an image signal detected from a stimulable phosphor sheet (imaging plate) carrying a radiation image stored therein by scanning the stimulable phosphor sheet with stimulating rays, thereby to obtain a visible image having an improved image quality, particularly a high diagnostic efficiency and accuracy. This system is very useful particularly for medical diagnosis.

In the aforesaid system, image data on the image signal detected from the stimulable phosphor sheet is converted to digital data and, when necessary, the digital data is displayed on a CRT monitor. Also, the digital data is directly used for modulating the scanning light beam in a reproducing apparatus to reproduce a visible image on a light-sensitive material. Alternatively, the digital data is once stored in a recording medium such as a magnetic tape or a magnetic disk, converted to an electric signal for reproducing, and then used for modulating the scanning light beam in the reproducing apparatus as described above. Thereafter, the recording medium carrying the digital data recorded therein is stored for later reproducing of the radiation image.

Namely, the image data once used for diagnosis is stored for later investigation of the past record of the patient and, when necessary, it is used for again reproducing the radiation image. The method wherein the image data is stored in the form recorded in the recording medium such as a magnetic tape (digital file) is advantageous over the method wherein the image data is stored in the form recorded as a finally obtained visible image in a light-sensitive material (film) in that the space required for storage is smaller. Further, in the method of storing the image data in the form recorded in a film, it becomes impossible to reuse the silver contained in the film. Therefore, this method is not suitable from the viewpoint of effective use of resources. Further, in this method, it is not always easy to retrieve the stored image data.

Accordingly, in the aforesaid radiation image recording and reproducing system, the digital data once used should preferably be stored in a recording medium such as a magnetic tape or a magnetic disk (digital file).

However, even in the method of storing the digital data as a digital file, a problem with regard to the space for storage arises when the storage period becomes long and the number of digital files stored increases. Thus, it is desired to minimize the amount of the digital files stored.

SUMMARY OF THE INVENTION

The primary object of the present invention is to provide a method of storing digital data of the type as described above, which decreases the amount of files stored for a long period.

Another object of the present invention is to provide a method of storing digital data, which makes it possible to effectively utilize silver resources by recovering silver from films once used for recording a visible image.

The method in accordance with the present invention comprises the steps of, when the image data of the type as described above is stored, storing for short-term use the whole information that has been used for reproducing a radiation image and storing for long-term use a part of the information obtained by decreasing the amount of information to an extent necessary for investigating the past record of the patient so as to decrease the amount of the information to be stored for long-term use, thereby creating and storing the information for short-term use and the information for long-term use.

Namely, in the digital file for short-term use which is repetitively used for image reproducing over a short period of about one year or less, the digital data of the whole image information originally used for reproducing a radiation image is recorded and stored. In the digital file for long-term use which is subjected to long-term storage (including permanent storage), the data obtained by thinning out the digital data used for the image reproducing to reduce the amount of the information to a fraction (for example, one-fifth or less, or several tens of percent) of the original amount is recorded and stored. Since the digital data for long-term use is used for a general review of the past record and symptoms of the patient, no problem is presented even when the resolution of the reproduced image is decreased, and the purpose of the long-term storage is sufficiently accomplished even if the amount of the information is reduced to a fraction of the original amount. By this method the amount of space required for storing the file can be minimized without reducing the value of the stored information. On the other hand, since the data for short-term use is frequently used for diagnosis, for example, by comparing it with other data, and is important for diagnosis, it is necessary to store the complete data originally used for reproducing a radiation image.

In the present invention, it becomes possible to obtain digital data suitable for short-term use and long-term use in a way compatible with the need to economize resources and space as described above, and to store useful data for long-term use in a small space. On the other hand, the data for short-term use which is required for diagnosis over a short period can also be obtained securely. Accordingly, the present invention makes it possible to store the data in the manner satisfying the need in practical use.

BRIEF DESCRIPTION OF THE DRAWING

The single drawing is a schematic view showing a radiation image recording and reproducing system wherein the method of storing radiation image data in accordance with the present invention is employed.

DESCRIPTION OF THE PREFERRED EMBODIMENTS

The present invention will hereinbelow be described in further detail with reference to the accompanying drawing.

The single drawing schematically shows the whole composition of a radiation image recording and reproducing system in which the method of storing radiation image data in accordance with the present invention is employed.

A stimulable phosphor sheet 3 is exposed to X-rays emitted from an X-ray source 1 and passed through an object 2 to have an X-ray image of the object 2 stored in the stimulable phosphor sheet 3. Then, the stimulable phosphor sheet 3 carrying the X-ray image stored therein is scanned and stimulated with a laser beam 4a which is emitted from a laser beam source 4 and which causes the stimulable phosphor sheet 3 to emit light 3a upon stimulation. The light 3a emitted by the stimulable phosphor sheet 3 is photoelectrically detected by a photomultiplier 5 and converted to a digital image signal 5a corresponding to the stored X-ray image by an A/D converter 5'. The image signal 5a is sent to an image processing section 6 for conducting frequency processing and/or gradation processing. In this manner, an image signal 6a for reproducing which has been processed as desired is obtained from the image processing section 6.

A part of the image signal 6a is sent to a monitor television 7 for monitoring the radiation image and to a reproducing apparatus 8 for reproducing a visible image on a light-sensitive film 9 by use of a laser beam scanner 8A. (Reproducing of the visible Cimage may also be conducted in such a manner that a latent image is once recorded and then developed to a visible image.)

The image signal 6a is also sent to a magnetic recording device 10 such as a magnetic disk for recording the data for short-term use. At the same time, the image signal 6a is fed to a device for recording a digital file 12 for long-term use, for example an optical disk, via a signal processing circuit 11 for reducing the amount of the information. Thus, data 11a for long-term storage obtained by reducing the amount of the information to a fraction of the original amount is recorded in the digital file 12 for long-term use.

For example, the image data for short-term use recorded in the magnetic recording device 10 is recorded as 8-bit digital data at a density of 5 pixel/mm when the image size is 356mm×432mm. The image data 11a recorded in the digital file 12 for long-term use is recorded, for example, as 6-bit digital data at a density of 2.5 pixel/mm for the same image size as the size described above (the amount of information recorded is about one-fifth of the amount of information recorded in the magnetic recording apparatus 10).

The device 10 for recording the image data for short-term use is not limited to a magnetic recording device. For example, the device 10 may be an optical recording type device such as an optical disk. On the other hand, the device for recording the digital file 12 long-term use is not limited to an optical recording device such as an optical disk. Thus, the digital file 12 may be recorded in a magnetic disk or a magnetic tape. Practically, however, the digital file 12 should preferably be recorded in an optical disk since optical disks have large recording capacity and are useful for saving space as is required for long-term storage.

Further, the ratio of the amount of the digital data for long-term use to the amount of the digital data for short-term use is not limited to 1:5. Thus, the ratio may be 1:2 or 1:3. However, from the viewpoint of the storage space, the amount of the digital data for long-term use should preferably be reduced to one-fifth or less (for example, one-twentieth, or desirably one-tenth) of the amount of the digital data for short-term use. It has been found that, even when the amount of the digital data for long-term use is reduced in a ratio as described above, there is obtained a reproduced image having an image quality sufficiently suitable for practical use.

In order to further decrease the space required for storage, the image data for short-term use and for long-term use may be compressed by using the ordinary band compression technique and stored in the compressed form.

In the embodiment described above, the data stored is the digital data subjected to image processing. However, it is also possible to store the original image data before it is subjected to image processing.

We claim:

1. A method of storing radiation image data comprising the steps of:
   (i) scanning a stimulable phosphor sheet carrying a radiation image stored therein with stimulating rays which cause said stimulable phosphor sheet to emit light in proportion to the radiation energy stored therein, photoelectrically detecting the emitted light and coverting it into an electric signal,
   (ii) converting the obtained electric signal into a digital signal,
   (iii) on the basis of said digital signal, creating digital data in an amount necessary for reproducing said radiation image for use in diagnosis and digital data for storage obtained by reducing the amount of information to a fraction of the amount of said digital data for diagnosis, and
   (iv) recording said digital data for diagnosis and said digital data for storage in separate recording media;
   wherein the amount of said digital data for storage is reduced to approximately one fifth or less of the amount of said digital data for diagnosis. recording medium.

2. A method as defined in claim 1 wherein said digital data for storage is recorded in an optical disk.

3. A method as defined in claim 1 wherein said digital data for diagnosis is recorded in a magnetic recording medium.

4. A method as defined in claim 1 wherein the amount of said digital data for storage is reduced to about one-tenth of the amount of said digital data for diagnosis.

* * * * *